(12) United States Patent
Kobayashi et al.

(10) Patent No.: US 9,057,775 B2
(45) Date of Patent: Jun. 16, 2015

(54) SIGNAL GENERATOR, RADAR DEVICE (75) Inventors: Yuka Kobayashi, Yokohama (JP); Hiroki Sakurai, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 468 days.

(21) Appl. No.: 13/423,456

(22) Filed: Mar. 19, 2012

(65) Prior Publication Data

US 2012/0319889 A1    Dec. 20, 2012

(30) Foreign Application Priority Data

Jun. 16, 2011 (JP) ................. P2011-134255

(51) Int. Cl.
*G01S 13/34* (2006.01)
*G01S 7/40* (2006.01)

(52) U.S. Cl.
CPC .............. *G01S 7/4008* (2013.01); *G01S 13/345* (2013.01)

(58) Field of Classification Search
CPC ....... G01S 13/345; G01S 7/35; G01S 7/4008; G01S 13/341
USPC .................. 342/100, 128–135, 175, 195, 200
See application file for complete search history.

(56) References Cited

U.S. PATENT DOCUMENTS

| | | | | |
|---|---|---|---|---|
| 4,593,287 A | * | 6/1986 | Nitardy | .......................... 342/200 |
| 6,038,268 A | * | 3/2000 | Kawai | ............................. 375/334 |
| 6,114,987 A | | 9/2000 | Bjornholt | |
| 2003/0067405 A1 | * | 4/2003 | Keaveney et al. | ............. 341/143 |
| 2010/0073222 A1 | * | 3/2010 | Mitomo et al. | ............... 342/175 |
| 2010/0213993 A1 | | 8/2010 | Hongo | |
| 2010/0245160 A1 | * | 9/2010 | Sakurai et al. | ................ 342/200 |
| 2011/0227785 A1 | * | 9/2011 | Sakurai | ........................ 342/200 |
| 2012/0112806 A1 | * | 5/2012 | Dayi | ............................. 327/145 |

FOREIGN PATENT DOCUMENTS

| | | |
|---|---|---|
| EP | 2 184 857 A1 | 5/2010 |
| JP | 2002-062355 A | 2/2002 |
| JP | 2008-072257 A | 3/2008 |
| JP | 2008-224350 A | 9/2008 |
| WO | WO 2009/028010 A1 | 3/2009 |

* cited by examiner

*Primary Examiner* — John B Sotomayor
*Assistant Examiner* — Marcus Windrich
(74) *Attorney, Agent, or Firm* — Holtz, Holtz, Goodman & Chick PC (57) ABSTRACT

A signal generating circuit includes an oscillator to produce an oscillation signal controlled in oscillating frequency by an analog control signal. The circuit includes: a digital phase detector detecting phase information of the oscillation signal and outputting digital phase information; a first differentiator differentiating the digital phase information and outputting digital frequency information; a comparator comparing a frequency setting code setting the oscillating frequency with the digital frequency information and outputting digital frequency error information; and a low-pass filter removing a high-frequency component of the digital frequency error information. The circuit further includes: a D/A converter converting the digital frequency error information of which high-frequency component is removed into analog frequency error information; and an integrator integrating the analog frequency error information, to convert into analog phase error information, and outputting the analog phase error information as the analog control signal.

16 Claims, 9 Drawing Sheets

SIGNAL GENERATOR, RADAR DEVICE

CROSS-REFERENCE TO RELATED APPLICATION

This application is based upon and claims the benefit of priority from the prior Japanese Patent Application No. 2011-134255, filed on Jun. 16, 2011; the entire contents of which are incorporated herein by reference.

FIELD

Embodiments described herein relate generally to a signal generating circuit, and a radar device.

BACKGROUND

A radar device using an FMCW (Frequency Modulated Continuous Wave) signal receives the FMCW signal transmitted from a transmitter and reflected by an object, and multiplies the received signal and a transmitted signal transmitted at the receiving time. Here, an output signal frequency of a multiplier is determined by a time difference between the both signals, and therefore, it is possible to find a distance and a relative speed with the object, and so on.

The FMCW signal for radar use is required to have a characteristic in which a frequency changes approximately linearly relative to the time. Conventionally, a method obtaining a high linear characteristic by using an error obtained by converting a frequency of an output signal of a voltage controlled oscillator into a voltage, and thereafter comparing the voltage with a voltage signal in a triangular wave state input from external is known. Otherwise, a method in which a frequency of a reference signal of a triangular wave is multiplied by using a phase synchronization circuit of which loop bandwidth is narrow, and thereafter the multiplied signal is used as a reference signal of a phase synchronization circuit of which loop bandwidth is wide, and so on are known.

However, there are problems in the conventional methods in which it is difficult to suppress a phase noise of the voltage controlled oscillator and to maintain a linearity of the FMCW signal, and a means to correct the error is additionally required. An object of a signal generating circuit (or a signal generator) and a radar device according to an embodiment is to provide a signal generating circuit (a signal generator) and a radar device capable of obtaining a low-noise, high-frequency accuracy, and high-linearity FMCW signal.

BRIEF SUMMARY OF THE INVENTION

To solve the above-stated problems, a signal generating circuit (or a signal generator) according to an embodiment includes an oscillator to produce an oscillation signal controlled in oscillating frequency by an analog control signal. This signal generating circuit includes: a digital phase detector detecting phase information of the oscillation signal and outputting digital phase information; a first differentiator differentiating the digital phase information and outputting digital frequency information; a comparator comparing a frequency setting code setting the oscillating frequency with the digital frequency information and outputting digital frequency error information; and a low-pass filter removing a high-frequency component of the digital frequency error information. Further, the signal generating circuit includes: a D/A converter converting the digital frequency error information of which high-frequency component is removed into analog frequency error information; and an integrator integrating the analog frequency error information, to convert into analog phase error information, and outputting the analog phase error information as the analog control signal.

DETAILED DESCRIPTION (First Embodiment)

Figure 1:
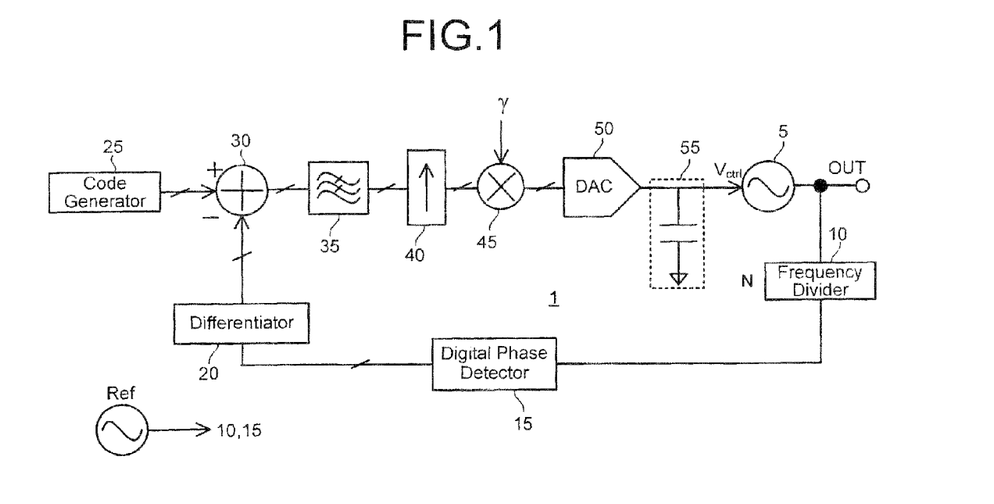
FIG. 1 is a block diagram illustrating a configuration of a signal generating circuit according to a first embodiment.
Figure 2A:
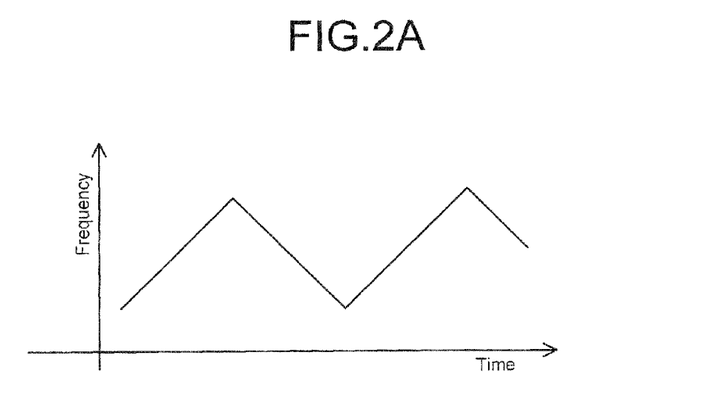
FIG. 2A is a view representing a frequency of an output signal of the signal generating circuit illustrated in FIG. 1.
Figure 2B:
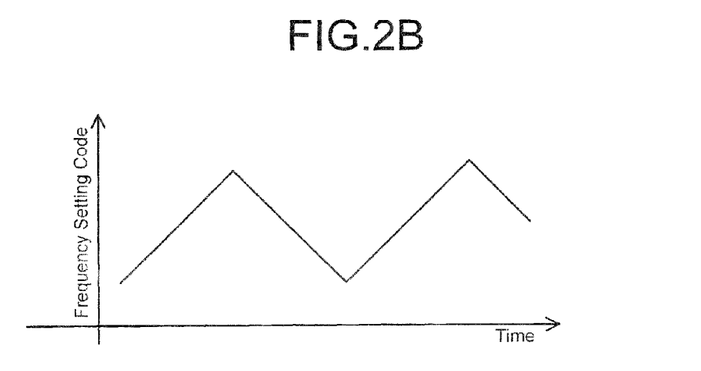
FIG. 2B is a view representing a frequency setting code of the signal generating circuit illustrated in FIG. 1.
Figure 3:
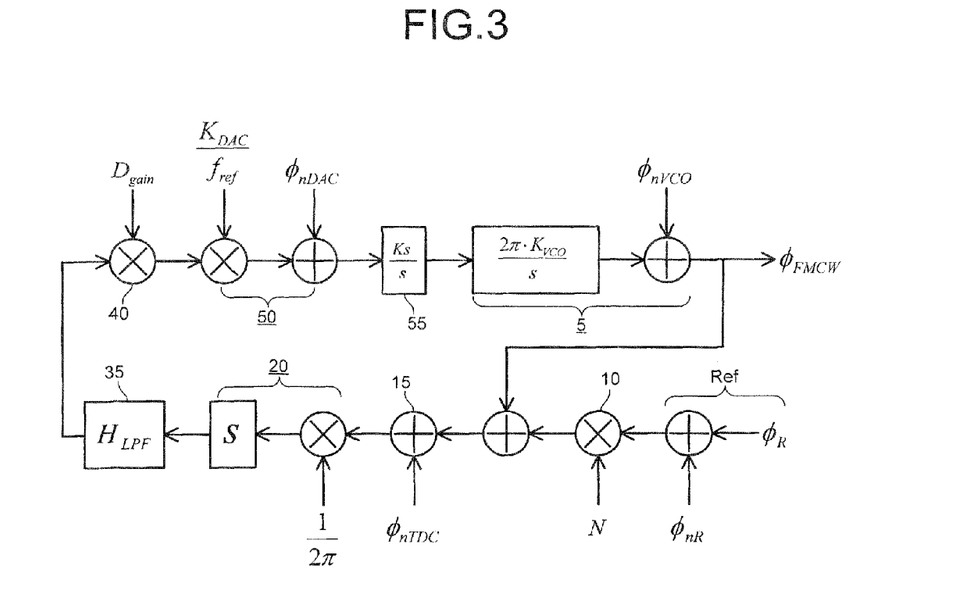
FIG. 3 is a block diagram illustrating a transfer characteristic in the signal generating circuit according to the first embodiment.

Hereinafter, a signal generating circuit according to a first embodiment is described in detail with reference to FIG. 1 to FIG. 3. As illustrated in FIG. 1, a signal generating circuit 1 according to the first embodiment includes a voltage controlled oscillator 5 (VCO5) of which oscillation frequency changes in accordance with an analog control voltage, a frequency divider 10 dividing an output signal of the VCO5 with a predetermined frequency division number N, a digital phase detector 15 detecting phase information from an output signal of the frequency divider 10 and outputting digital phase information, and a differentiator 20 differentiating the digital phase information output by the digital phase detector 15 and converting into digital frequency information.

Besides, the signal generating circuit 1 of the embodiment includes a code generator 25 generating a predetermined frequency setting code, a comparator 30 (subtracter) comparing the digital frequency information output by the differentiator 20 and the frequency setting code generated by the code generator 25 and outputting digital error information, a low-pass filter 35 (LPF35) suppressing a high-frequency component included in the error information, a current output DA converter 50 (current output DAC50) converting the digital error information into analog error information and outputting as an analog current, and an integrator 55 integrating an output current of the current output DAC50 and generating the control voltage of the VCO5. Note that the signal generating circuit 1 of the embodiment may include a variable gainer 40 (or a variable attenuator) amplifying (or attenuating) an output of the LPF35 and a multiplier 45 multiplying an output of the variable gainer 40 and an arbitrary value.

The VCO5 generates an FMCW signal with a characteristic in which a frequency increases and decreases linearly relative to a time based on a control voltage $V_{ctrl}$. FIG. 2A represents an example of an oscillation signal of the VCO5, and an appearance in which an oscillation frequency increases and decreases in a sawtooth state relative to the time is represented. The oscillation signal of the VCO5 is used for a radar and so on, and has a very high frequency such as, for example, a millimeter wave band.

The frequency divider 10 divides the oscillation signal of the VCO5 with a predetermined frequency division ratio N. In general, a frequency of approximately several GHz is a limit for a digital phase detector to directly detect a signal phase. Accordingly, the frequency divider 10 acts to lower the frequency of the oscillation signal of the VCO5 up to a degree capable of being phase detected by the digital phase detector. For example, the frequency divider 10 divides the oscillation signal into 32 blocks to convert into a signal with a frequency of approximately 2.4 GHz when the oscillation signal of the VCO5 is used as the FMCW signal of a millimeter wave radar at 77 GHz band.

The digital phase detector 15 detects phase information of the output signal of the frequency divider 10 by each cycle of a reference signal Ref of a system, and outputs as a digital code. The digital phase detector 15 is able to be provided by, for example, a counter circuit counting and outputting the number of pulses of an input signal and a Time-to-Digital Converter (TDC) detecting a time difference between a rising edge of the input signal and a rising edge of the reference signal Ref and outputting as a digital code, or a combination of the above.

The differentiator 20 differentiates the digital phase information output by the digital phase detector 15 and converts into the digital frequency information.

The code generator 25 generates a digital signal having a value corresponding to a frequency change relative to the time of the oscillation signal of the VCO5 and outputs as the frequency setting code. The frequency setting code has a change of a value corresponding to the frequency change to be oscillated by the VCO5, and changes, for example, in a triangular wave and in a sawtooth wave state as represented in FIG. 2B. Namely, the frequency information output by the differentiator 20 changes in accordance with the frequency setting code if a gain of a negative-feedback loop of the circuit illustrated in FIG. 1 is enough high, and therefore, the output frequency of the VCO5 changes in the triangular wave or in the sawtooth wave state as same as the frequency setting code.

The comparator 30 calculates a difference between the frequency setting code generated by the code generator 25 and the frequency information output by the differentiator 20, and outputs as the error information. The LPF 35 is a filter removing a high-frequency component contained in the error information, and functions as an LPF of a PLL circuit.

The variable gainer 40 performs an amplifying/attenuating process of an amplitude component of the error information output from the LPF35 to be a predetermined level. The multiplier 45 has a function multiplying the error information by a predetermined coefficient according to need. The variable gainer 40 and the multiplier 45 may not be used in the first embodiment.

The current output DAC50 converts the input digital error signal into the analog error signal, and outputs as the analog current. The integrator 55 is made up of, for example, a capacitor and so on, and acts to convert the current output by the current output DAC50 into a voltage. The voltage converted by the integrator 55 is provided for the VCO5 as the control voltage $V_{ctrl}$.

Note that a current output DAC can also be provided by a voltage output DAC. In this case, the integrator 55 is made up of an analog voltage integrator constituted by an operational amplifier circuit, a resistor, and a capacitor, and an output thereof is made to be the control voltage of the VCO5.

When the error information output by the comparator 30 is constant and a positive value, a constant current flows into the capacitor constituting the integrator 55, and therefore, it is possible to obtain the control voltage $V_{ctrl}$ increasing at a constant ratio relative to the time. As a result, the VCO5 generates the oscillation signal of which frequency becomes flatly high relative to the time.

Calculations of respective elements from the digital phase detector 15 to the current output DAC50 are calculations of digital information (digital signal), and enabled by using digital circuits. Accordingly, an element affecting on a linearity of the oscillation frequency of the VCO5 is enabled by a digital process, and therefore, analog passive elements such as a resistor and a capacitor become unnecessary, and stabilities of the circuit and the FMCW signal improve. Besides, an error caused by an element variance and so on of the passive element and so on does not occur, and therefore, a calculation with high accuracy is enabled.

Note that it is also possible to provide up to the integrator 55 by digital circuits. In this case, a mode in which an integrated digital code is converted into an analog control voltage by a voltage output DA converter, or a Digitally Controlled Oscillator (DCO) is directly controlled by using the integrated digital code may be taken.

Incidentally, when the signal generating circuit 1 of the embodiment is used for the FMCW radar, it is necessary that the control signal of the VCO changes approximately linearly relative to the time. As illustrated in FIG. 1, the current output digital analog converter may be constituted to output approximately constant current relative to the time when the integrator 55 is provided by an analog circuit such as a capacitor, and therefore, it is possible to enable with a relatively low operation speed. Namely, it is possible to reduce power consumption, suppress distortion, and obtain an oscillation signal with high accuracy when the control voltage of the VCO is generated by a combination of the current output DAC and the analog integrator.

(Operations of First Embodiment)

Subsequently, operations of the signal generating circuit 1 according to the first embodiment are described with reference to FIG. 3. FIG. 3 illustrates a transfer function of the signal generating circuit 1 illustrated in FIG. 1. In FIG. 3, a symbol $\phi_{FMCW}$ is a phase noise of the FMCW signal, a symbol "$\phi_R$" is a phase noise of the reference signal Ref, a symbol "$\phi_{nR}$" is a phase noise of the reference signal, a symbol "N" is a frequency division number of the frequency divider 10, a symbol "$\phi_{nTDC}$" is a quantization noise generated at the digital phase detector 15, a symbol "$H_{LPF}$" is a transfer function of the LPF35, a symbol "$D_{gain}$" is a product of a gain of the variable gainer 40 and a gain of the multiplier 45, a symbol "$K_{DAC}$" is a gain of the current output DAC50, a symbol "$\phi_{nDAC}$" is a quantization noise generated at the current output DAC 50, a symbol "$K_s$" is a gain of the integrator 55, a symbol "$f_{ref}$" is a frequency of the reference signal, a symbol "$K_{VCO}$" is a gain of the VCO5, and a symbol "$\phi_{nVCO}$" is a phase noise generated at the VCO5. An open-loop loop transfer function "$H_{OP}$" in FIG. 3 is represented by an expression 1.

$$H_{op} = \frac{H_{LPF} \cdot D_{gain} \cdot K_{DAC} \cdot K_s \cdot K_{VCO}}{s} \quad (1)$$

Besides, a noise transfer function "$NTF_R$" from the symbol "$\phi_{nR}$" to an output, a noise transfer function "$NTF_{TDC}$" from the symbol "$\phi_{nTDC}$" to the output, a noise transfer function "$NTF_{DAC}$" from the symbol "$\phi_{nDAC}$" to the output, and a noise transfer function "$NTF_{VCO}$" from the symbol "$\phi_{nVCO}$" to the output are respectively represented by expressions 2 to 5.

$$NTF_R = N \cdot \frac{H_{OP}}{1 + H_{OP}} \quad (2)$$

$$NTF_{TDC} = \frac{H_{OP}}{1 + H_{OP}} \quad (3)$$

$$NTF_{DAC} = \frac{2\pi K_{VCO}/s^2}{1 + H_{OP}} \quad (4)$$

$$NTF_{VCO} = \frac{1}{1 + H_{OP}} \quad (5)$$

Namely, the "$NTF_R$", the "$NTF_{TDC}$" the "$NTF_{DAC}$" show characteristics of a low-pass filter, and the "$NTF_{VCO}$" shows a characteristic of a high-pass filter, and therefore, it turns out that high-frequency components are suppressed as for the noises generated at the reference signal Ref, the digital phase detector 15, and the current output DAC50, and low-frequency components are suppressed as for the noise generated at the VCO5. Namely, the signal generating circuit 1 forms a PLL loop.

A part of the oscillation signal of the VCO5 is divided by the frequency divider 10 and transmitted to the digital phase detector 15. The digital phase detector 15 detects the phase information from the divided oscillation signal and transmits the digital phase information to the differentiator 20. The differentiator 20 converts the digital phase information into the digital frequency information and provides for the comparator 30.

The comparator 30 compares the frequency setting code generated by the code generator 25 and the digital frequency information, and outputs the error information. The error information is transmitted to the current output DAC50 via the LPF35, the variable gainer 40, and the multiplier 45. The current output DAC50 converts the digital error information into the analog error information and supplies the analog current to the integrator 55. The integrator 55 converts the supplied current into the voltage and provides for the VCO5. As stated above, the signal generating circuit 1 forms the PLL loop, and therefore, the VCO5 generates the FMCW signal in accordance with the frequency setting code generated by the code generator 25.

As stated above, the calculations from the digital phase detector to the current output DAC are enabled by using the digital circuits according to the signal generating circuit of the present embodiment, and therefore, the passive elements such as the resistor and the capacitor are not necessary at the calculation part, and the stabilities of the circuit and the FMCW signal can be improved. Besides, the error caused by the element variance and so on of the passive element does not occur, and therefore, it is possible to reduce a circuit scale and to enable the calculation with high accuracy. Further, the control voltage is generated by the integrator made up of the current output DAC and the capacitor according to the signal generating circuit of this embodiment, and therefore, it is possible to reduce the circuit scale and the power consumption, suppress the distortion, and obtain the oscillation signal with high accuracy.

(Second Embodiment)

Figure 4:
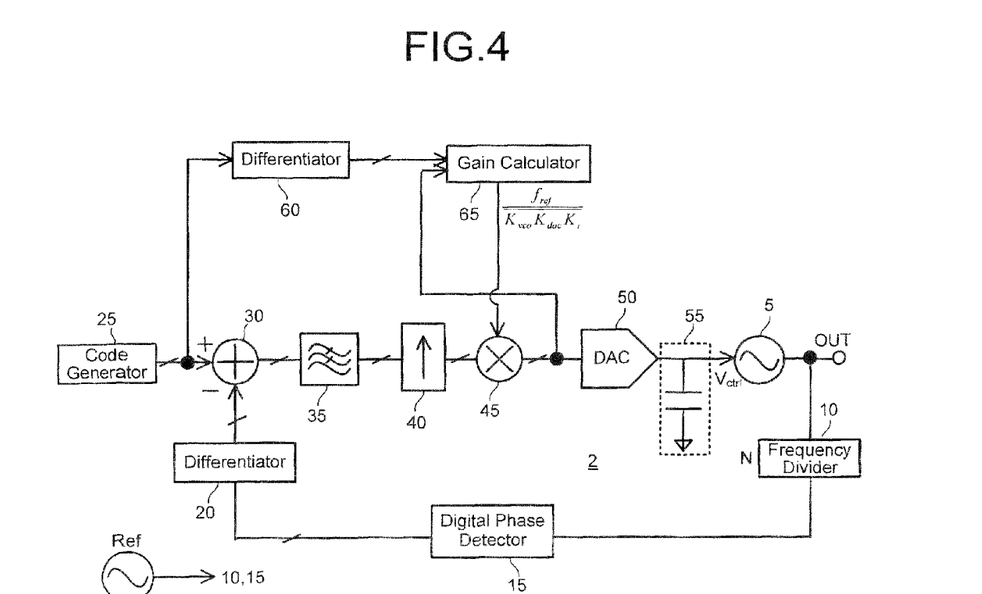
FIG. 4 is a block diagram illustrating a configuration of a signal generating circuit according to a second embodiment.

Next, a signal generating circuit according to a second embodiment is described in detail with reference to FIGS. 4, 5A to 5D. As illustrated in FIG. 4, a signal generating circuit 2 of the second embodiment is the one in which a control loop of a gain calibration is added to the signal generating circuit 1 of the first embodiment. In the following description, common reference numerals are used to designate elements common to the signal generating circuit of the first embodiment, and redundant descriptions are not given.

As illustrated in FIG. 4, the signal generating circuit 2 of the second embodiment includes a differentiator 60 performing a differential process of the frequency setting code output by the code generator 25, and a gain calculator 65 calculating a ratio between the differentiation result and the digital error information input to the current output DAC50 and providing the calculation result for the multiplier 45, in addition to the signal generating circuit 1 illustrated in FIG. 1. The multiplier 45 multiplies the error information by the provided ratio as a gain (coefficient). In the signal generating circuit 2 of this embodiment, a gain calibration function is provided.

Figure 5A:
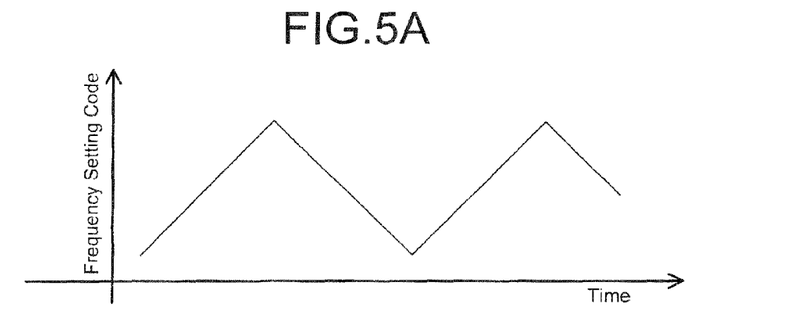
FIG. 5A is a view representing a frequency setting code of the signal generating circuit illustrated in FIG. 4.
Figure 5B:
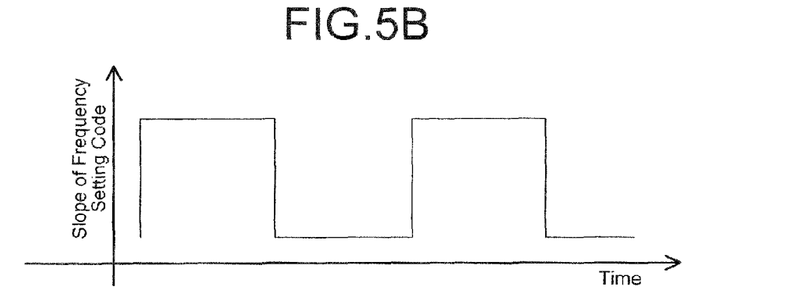
FIG. 5B is a view representing a slope of the frequency setting code of the signal generating circuit illustrated in FIG. 4.
Figure 5C:
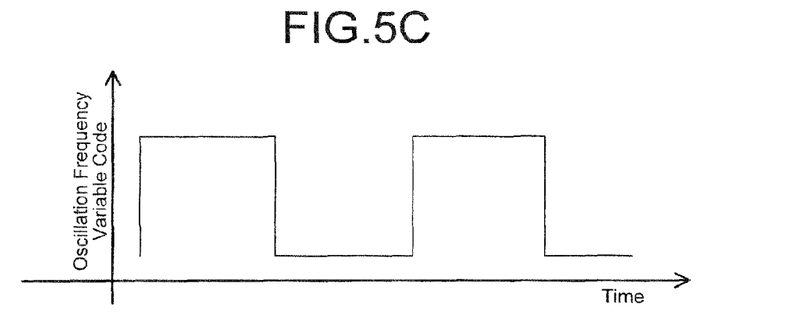
FIG. 5C is a view representing an oscillation frequency variable code of the signal generating circuit illustrated in FIG. 4.
Figure 5D:
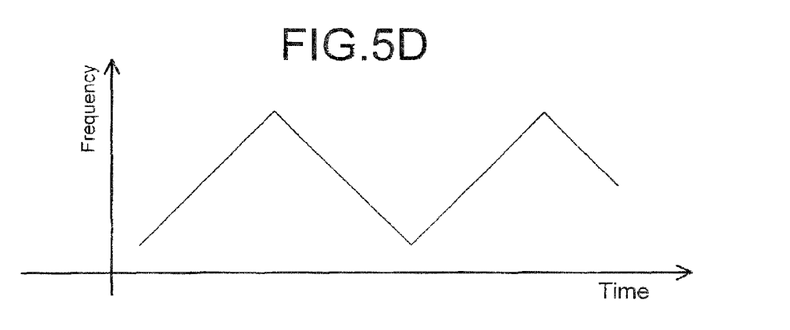
FIG. 5D is a view representing an oscillation frequency of the signal generating circuit illustrated in FIG. 4.

FIGS. 5A to 5D represent appearances of signal information at the signal generating circuit 2 of the second embodiment when the PLL follows the frequency setting code and generates a signal in a triangular wave shape. As illustrated in FIG. 5A, the code generator 25 generates the frequency setting code represented by, for example, the triangular wave shape, the differentiator 60 differentiates the frequency setting code and outputs the signal information having a waveform as illustrated in FIG. 5B. As illustrated in FIG. 5B, an output of the differentiator 60 represents a slope of the frequency setting code. FIG. 5C represents a multiplication result in which the multiplier 45 multiplies the error information by the coefficient. The current output DAC50 converts the signal information in a rectangular wave shape (FIG. 5C) of which values are different in accordance with the slope of the frequency setting code into an analog current. The signal in the rectangular wave shape converted into the analog current is converted into a voltage by the integrator 55, and the VCO5 outputs an oscillation signal having a frequency characteristic represented in FIG. 5D.

(Function of Gain Calibration)

It is necessary to normalize a gain of each element into a constant gain independent of a process to obtain a desired loop bandwidth while keeping the loop bandwidth constant when the process varies or the gain of each element of a signal generating circuit is unknown. A digital circuit constantly outputs a known gain independent of the process, and therefore, the gain of the analog circuit part which is unknown (the gains "$K_{DAC} \cdot K_S \cdot K_{VCO}$" of the current output DAC50, the integrator 55, the VCO5) is to be normalized into constant values which are independent of the process in the signal generating circuit of the embodiment.

Figure 6:
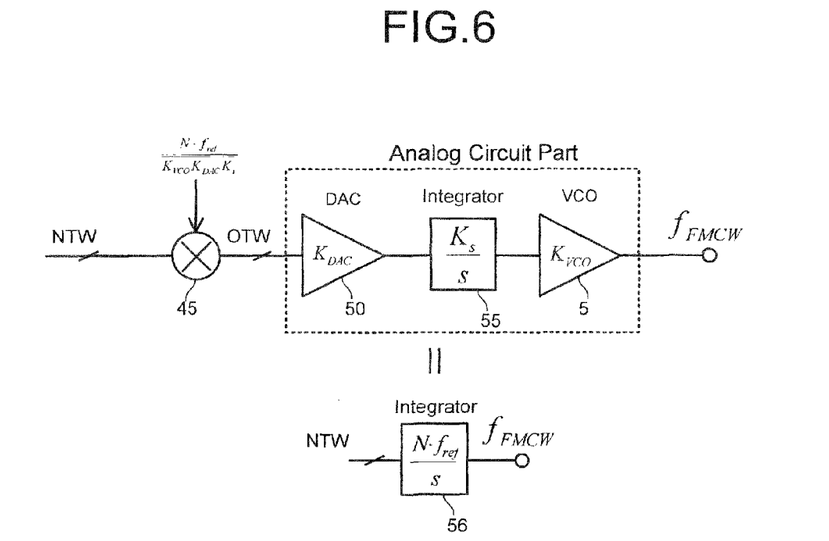
FIG. 6 is a view explaining a gain normalization in the second embodiment.

In the gain calibration in the signal generating circuit 2 of the embodiment, a product of the "$K_{DAC}$", the "$K_S$", and the "$K_{VCO}$" is calculated as the gain from the slope of the frequency setting code changing linearly relative to the time and input information to the current output DAC50. The input information to the current output DAC50 is multiplied by the "N·$f_{ref}$/($K_{DAC}$·$K_S$·$K_{VCO}$)" by using the calculated gain, and thereby, it is possible to equivalently normalize the gain of the whole of the analog circuit part into a constant value independent of the process determined by the reference signal frequency $f_{ref}$ and the frequency division ratio N as illustrated in FIG. 6. Namely, it is possible to normalize the analog circuit part of the signal generating circuit 2 by the integrator 60 and the gain calculating part 65, and to stabilize the PLL loop of the signal generating circuit 2.

Figure 7:
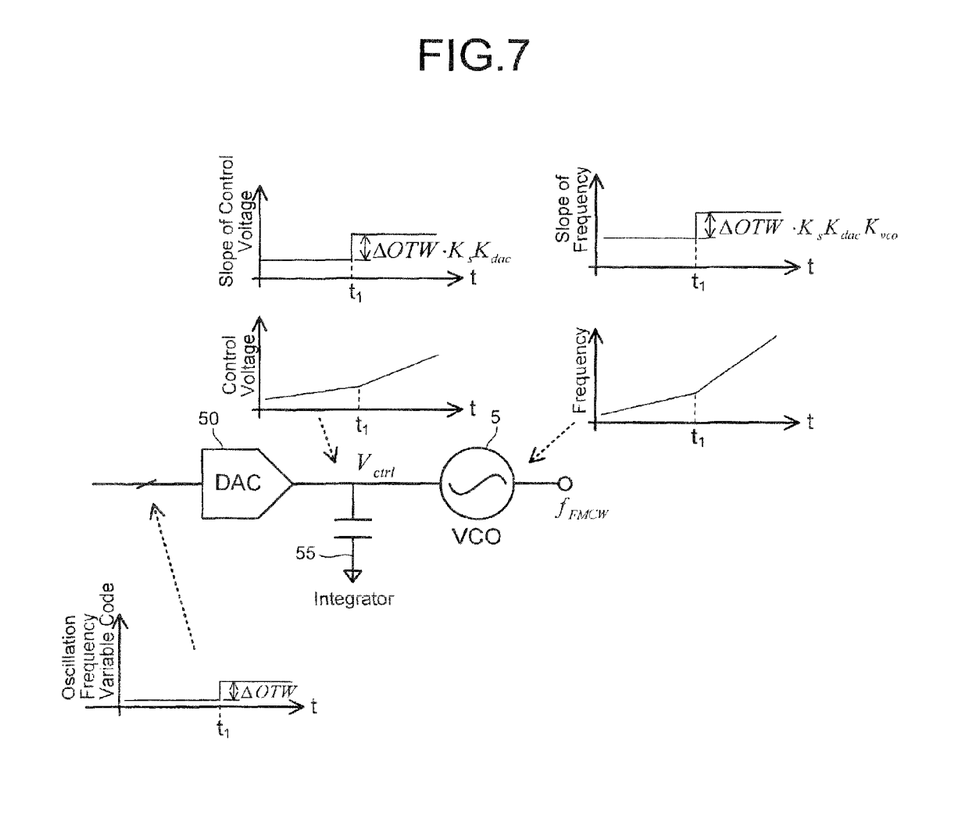
FIG. 7 is a view explaining a gain of an analog circuit part in the second embodiment.

FIG. 7 illustrates operations of the analog circuit part of the signal generating circuit 2 of the embodiment. When an OTW (Oscillator Tuning Word) which is larger than "0" (zero) and a fixed value is applied as the input information of the current output DAC50, the current output DAC50 makes the current which is constantly in proportion to the OTW and a fixed value flow in the integrator 55. Accordingly, the VCO5 changes the oscillation frequency in accordance with the output voltage of the integrator 55, and the frequency of the output signal becomes higher in accordance with an increase of the output voltage of the integrator 55 because the output voltage of the integrator 55 increases at a slope in proportion to the OTW. The gain of the analog circuit part in the signal generating circuit 2 found in the gain calibration is a change amount of a slope of an output frequency $f_{FMCW}$ changing linearly relative to the time generated when the OTW being the input information of the current output DAC50 is minutely changed for ΔOTW in a certain period of time as illustrated in FIG. 7, and it is represented by an expression 6.

$$K_{DAC}K_S K_{VCO} = \frac{\Delta\left(\frac{df_{FMCW}}{dt}\right)}{\Delta OTW} \quad (6)$$

It is necessary to change the output frequency to have a linear characteristic of which slops are different relative to the time to make the "$K_{DAC}$·$K_S$·$K_{VCO}$" at a constant value independent of the time from the expression 6. When the gain of the negative-feedback loop is enough high and the output frequency of the VCO5 follows a frequency setting code FCW, the output of the signal generating circuit 2 satisfies a relationship of "$f_{FMCW}$=FCW·N·$f_{ref}$". Accordingly, the frequency setting code FCW is to be changed linearly to linearly change the output frequency relative to the time. When the frequency setting code changing linearly relative to the time is represented by a slope SCW of the frequency setting code and an initial value $FCW_{initial}$ of the FCW before a frequency modulation is performed, it becomes as an expression 7.

$$FCW = SCW \cdot t + FCW_{initial} \quad (7)$$

Accordingly, the gain "$K_{DAC}$·$K_S$·$K_{VCO}$" of the analog circuit part becomes as an expression 8.

$$K_{DAC}K_S K_{VCO} = \frac{\Delta\left(\frac{d(FCW \cdot N \cdot f_{ref})}{dt}\right)}{\Delta OTW}$$

$$= N \cdot f_{ref} \frac{\Delta\left(\frac{d(FCW)}{dt}\right)}{\Delta OTW}$$

$$= N \cdot f_{ref} \frac{\Delta SCW}{\Delta OTW} \quad (8)$$

It is possible to estimate the gain of the analog circuit part by changing the slope of the frequency setting code linearly changing relative to the time, calculating a change amount of the slope and a change amount of the input information of the current output DAC50 generated by the change of the slope, and finding a ratio thereof. Besides, it is also possible to similarly estimate the gain of the analog circuit part by calculating a slope when the frequency setting code which does not change according to time is linearly changed relative to the time from a certain time and a change amount of an input code of the current output DAC50 occurred before and after the frequency setting code is linearly changed relative to the time.

In the gain calibration, it is necessary to linearly change the frequency setting code relative to the time, but the frequency setting code which changes linearly relative to the time at the frequency modulation time is used in the signal generating circuit 2 of the embodiment, and therefore, an additional circuit is not necessary. Namely, in the signal generating circuit 2 of the second embodiment, the gain calibration by the gain calculator 65 is enabled by linearly changing the frequency setting code relative to the time, calculating the slope of the frequency setting code by the differentiator 60, and using the differentiation result of the differentiator 60 as the slope of the frequency setting code.

Note that in the description of FIG. 7, the OTW which is larger than "0" (zero) and the fixed value is applied as the input information of the current output DAC50, but it is not limited. It is possible to similarly explain even in a case when it is set from a predetermined fixed value to "0" (zero).

(Third Embodiment)

Figure 8:
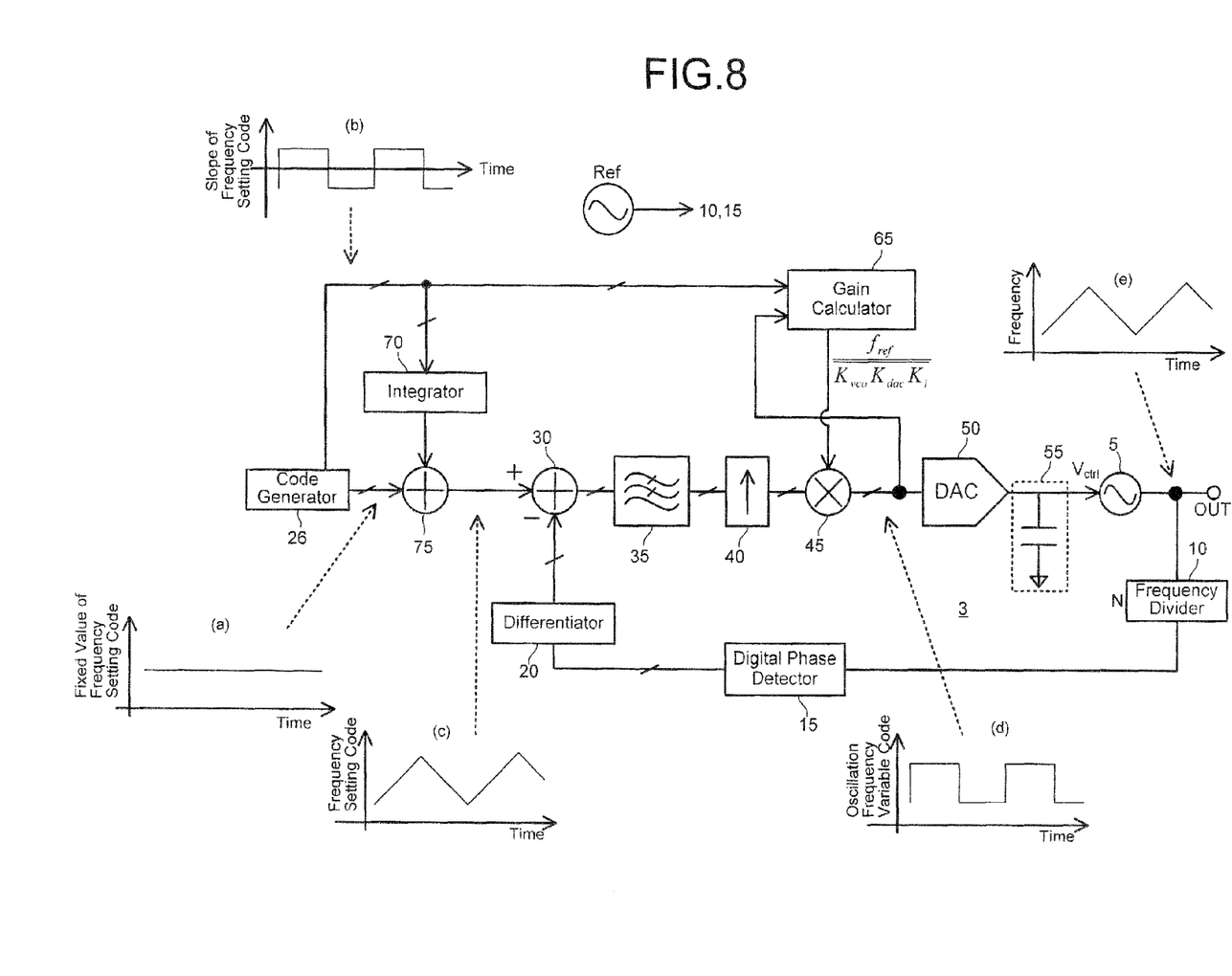
FIG. 8 is a block diagram illustrating a configuration of a signal generating circuit according to a third embodiment.

Next, a signal generating circuit according to a third embodiment is described with reference to FIG. 8. As illustrated in FIG. 8, a signal generating circuit 3 of this embodiment is the one in which the control loop of the gain calibration in the signal generating circuit 2 of the second embodiment is changed. In the following description, common reference numerals are used to designate elements common to the signal generating circuits of the first and second embodiments, and redundant descriptions are not given.

As illustrated in FIG. 8, the signal generating circuit 3 of the third embodiment includes an integrator 70 and an adder 75 in addition to the elements of the signal generating circuit 1 illustrated in FIG. 1. Besides, the signal generating circuit 3 of this embodiment includes a code generator 26 instead of the code generator 25.

The code generator 26 in the signal generating circuit 3 of this embodiment outputs a fixed value of the frequency setting code and change amount information of the frequency setting code. The fixed value of the frequency setting code is a code of a constant value relative to the time (refer to FIG. 8(*a*)). On the other hand, the change amount information of the frequency setting code is a code representing a change amount of the frequency setting code by positive and negative values, and it corresponds to slopes of the frequency setting code (refer to FIG. 8(*b*)).

The integrator 70 integrates the change amount of the frequency setting code output by the code generator 26 and provides to the adder 75. The adder 75 adds the integration result of the integrator 70 and the fixed value of the frequency setting code output by the code generator 26. As a result of the addition process of the adder 75, the code similar to the frequency setting code output by the code generator 25 of the first embodiment can be obtained (refer to FIG. 8(*c*)). The gain calculator 65 calculates a ratio between the change amount information of the frequency setting code output by the code generator 26 and the digital error information input to the current output DAC50, and provides the calculation result for the multiplier 45.

As a result of the above, the multiplier 45 outputs error information as illustrated in FIG. 8(*d*), and therefore, the VCO5 outputs an oscillation signal having a frequency characteristic as illustrated in FIG. 8(*e*).

Namely, in the signal generating circuit 3 illustrated in FIG. 8, the frequency setting code changing linearly relative to the time is obtained by using the change amount information of the frequency setting code changing in a pulse state relative to the time and the integrator. Besides, in the signal generating circuit 3 illustrated in FIG. 8, the change amount of the frequency setting code is provided for the gain calculator as the slope of the frequency setting code to thereby enable the gain calibration. It is also possible in the signal generating circuit 3 of the third embodiment to keep the loop bandwidth constant, secure a modulation bandwidth, and optimize a phase noise by performing the gain calibration as same as the second embodiment.

(Fourth Embodiment)

Figure 9:
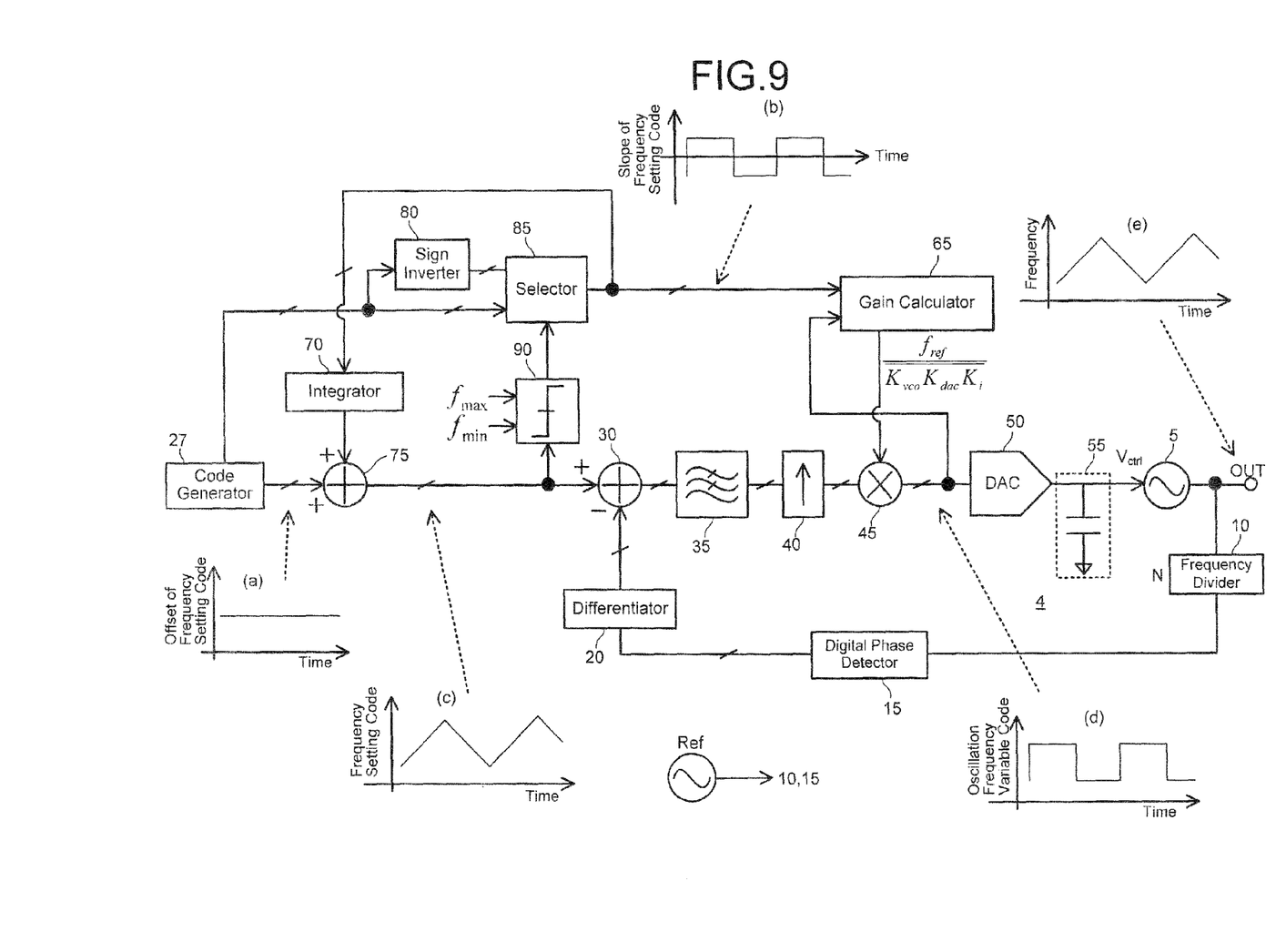
FIG. 9 is a block diagram illustrating a configuration of a signal generating circuit according to a fourth embodiment.

Next, a signal generating circuit according to a fourth embodiment is described with reference to FIG. 9. As illustrated in FIG. 9, a signal generating circuit 4 of this embodiment is the one in which the control loop of the gain, calibration in the signal generating circuit 2 of the second embodiment is changed. In the following description, common reference numerals are used to designate elements common to the signal generating circuits of the first and second embodiments, and redundant descriptions are not given.

As illustrated in FIG. 9, the signal generating circuit 4 of the fourth embodiment includes the integrator 70, the adder 75, a sign inverter 80, a selector 85, and a comparator 90 in addition to the signal generating circuit 1 illustrated in FIG. 1. Besides, the signal generating circuit 4 of this embodiment includes a code generator 27 instead of the code generator 25.

The code generator 27 in the signal generating circuit 4 of this embodiment outputs a fixed value of the frequency setting code and change amount information of the frequency setting code. The fixed value of the frequency setting code is a code at a constant value relative to the time (refer to FIG. 9(*a*)). On the other hand, the change amount information of the frequency setting code is a code at a constant value relative to the time in which an absolute value of the change amount of the frequency setting code is indicated, and corresponds to an absolute value of a slope of the frequency setting code.

The sign inverter 80 inverts a sign of the change amount information of the frequency setting code. The integrator 70 integrates the change amount information (refer to FIG. 9(*b*)) of the frequency setting code input to the gain calculator 65, and provides for the adder 75. The adder 75 adds the fixed value of the frequency setting code generated by the code generator 27 and the integration result of the integrator 70, and generates the frequency setting code (refer to FIG. 9(*c*)). The adder 75 provides the addition result for the comparator 30.

The comparator 90 compares the frequency setting code output by the adder 75 with predetermined first frequency setting information $f_{max}$ and second frequency setting information $f_{min}$. The selector 85 selects either of the output of the sign inverter 80 or the change amount of the frequency setting code generated by the code generator 27 based on the output of the comparator 90. The selector 85 provides the selected result for the integrator 70 and the gain calculator 65. The gain calculator 65 calculates a ratio of the output of the selector 85 and the digital error information input to the current output DAC50, and provides the calculation result for the multiplier 45. Namely, in the signal generating circuit 4 of the fourth embodiment illustrated in FIG. 9, the frequency setting code changing linearly relative to the time is obtained (refer to FIG. 9(*c*)) by integrating the output of the selector 85.

The current output DAC50 converts the output of the multiplier 45 (refer to FIG. 9(*d*)) into an analog current, and the integrator 55 converts the analog current into a control voltage. Accordingly, the VCO5 outputs an oscillation signal having a frequency characteristic as illustrated in FIG. 9(*e*).

The output of the selector 85 corresponds to the slope of the frequency setting code (refer to FIG. 9(*b*)), and therefore, the gain calculator 65 is able to enable the gain calibration as same as the second or third embodiment. It is also possible in the signal generating circuit 4 according to the fourth embodiment to keep the loop bandwidth constant, secure the modulation bandwidth, and optimize the phase noise by performing the gain calibration as same as the second or third embodiment.

(Operation Example 1 of Calibration)

Figure 10:
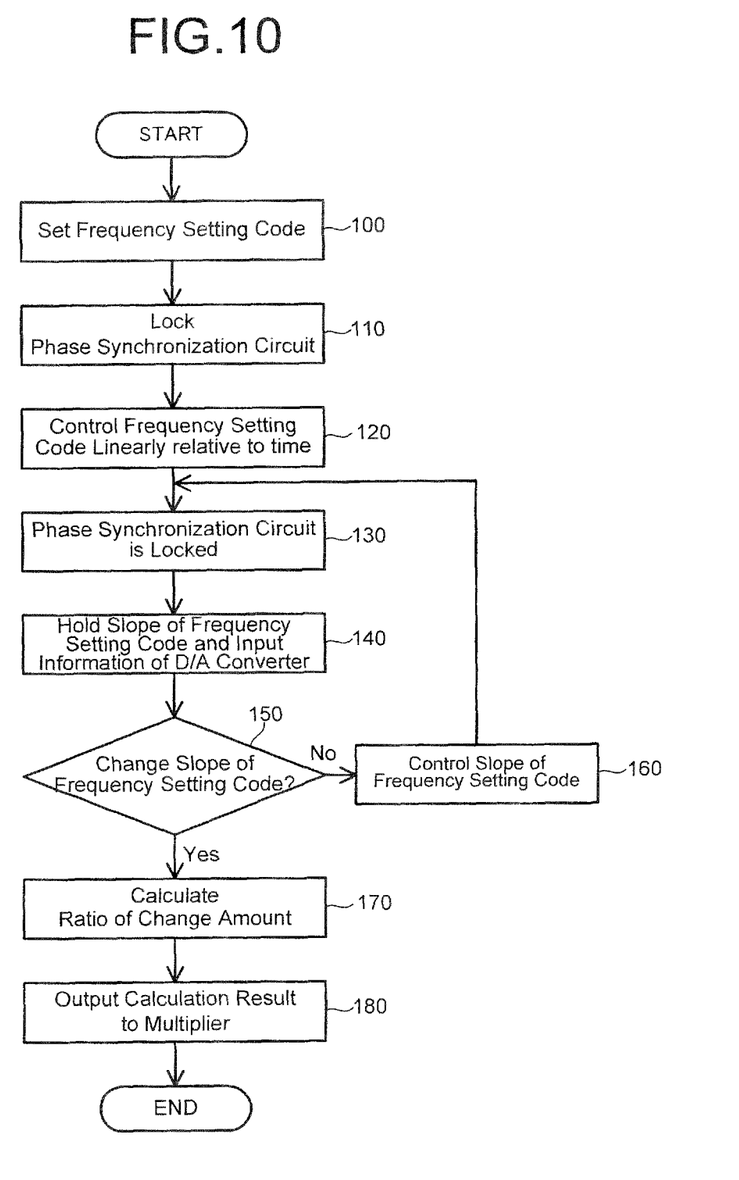
FIG. 10 is a flowchart explaining a gain calibration in the second to fourth embodiments.

Here, the gain calibration operations in the signal generating circuits 2 to 4 of the second to fourth embodiments are described in detail with reference to FIG. 10. FIG. 10 is a flowchart illustrating the operation example of the gain calibration. Hereinafter, the signal generating circuit 2 illustrated in FIG. 4 is described as a representative example.

Before the gain calibration, the code generator 25 generates the frequency setting code at the fixed value and inputs to the comparator 30 (Step 100. Hereinafter, referred to as "S100"). The frequency setting code at the fixed value is input to the current output DAC50 via the LPF35, the variable gainer 40, the multiplier 45, and converted into the analog current. The integrator 55 converts the converted analog current into the control voltage, and the VCO5 oscillates based on the control voltage. At this time, the frequency setting code is the fixed value, and therefore, the VCO5 oscillates at a predetermined frequency.

The oscillation signal of the VCO5 is divided by the frequency divider 10, and input to the digital phase detector 15. The digital phase detector 15 extracts the phase information from the divided oscillation signal, and outputs the digital phase information. The differentiator 20 converts the digital phase information into the digital frequency information. The comparator 30 compares the frequency setting code output by the code generator 25 and the digital frequency information, but the frequency setting code is the fixed value, and therefore, the error information converges little by little. As a result, the signal generating circuit 2 is locked at a predetermined frequency, and the frequency of the oscillation signal of the VCO5 becomes the value corresponding to the frequency setting code (S110).

After the VCO5 is locked at the predetermined frequency, the code generator 25 outputs the frequency setting code which changes linearly relative to the time (S120). As a result, the VCO5 outputs the signal having the frequency change corresponding to the frequency setting code, and it is locked. Namely, the VCO5 starts the oscillation of the FMCW signal (S130).

The VCO5 is locked in the oscillation state of the FMCW signal, then the gain calculator 65 holds each of the change amount information of the frequency setting code and the error information input to the current output DAC50 (S140). The gain calculator 65 holds these information, and averaged values are used, and thereby, it is possible to suppress deterioration of an calibration accuracy caused by a quantization error of the digital phase detector 15.

Subsequently, the gain calculator 65 judges whether or not the change amount (slope) of the frequency setting code changes once (S150). When the slope of the frequency setting code never changes ("No" in S150), the gain calculator 65 makes the code generator 25 change the slope of the frequency setting code (S160). For example, the code generator 25 changes the frequency setting code of which slope is positive into negative. As a result, the VCO5 outputs the signal having the frequency change corresponding to the frequency setting code of which change amount is changed, and it is locked (S130). The gain calculator 65 holds each of the change amount of the frequency setting code after a phase synchronization circuit is locked and the input information to the current output DAC50 (S140).

When the slope of the frequency setting code is once changed ("Yes" in S150), the gain calculator 65 calculates each of the change amount of the slope of the frequency setting code and the change amount of the information input to the current output DAC50 by using values of the change amount information and the error information which are held before and after the change of the slope, and calculates a ratio between each of the change amounts (S170). A calculation result becomes "$N \cdot f_{ref}/K_{DAC} \cdot K_S \cdot K_{VCO}$", and therefore, it becomes possible to normalize the gain of the analog part by outputting the calculation result to the multiplier 45 (S180).

In the calibration operation example illustrated in FIG. 10, the gain calculator 65 instructs the change of the slope of the frequency setting code (for example, from positive to negative) to the code generator 25, and the code generator 25 changes the slope of the frequency setting code in accordance with the instruction. Accordingly, the gain calculator 65 is able to obtain the change amount information of the frequency setting code and the error information input to the current output DAC50 at both before and after the change of the slope.

(Operation Example 2 of Calibration)

Figure 11:
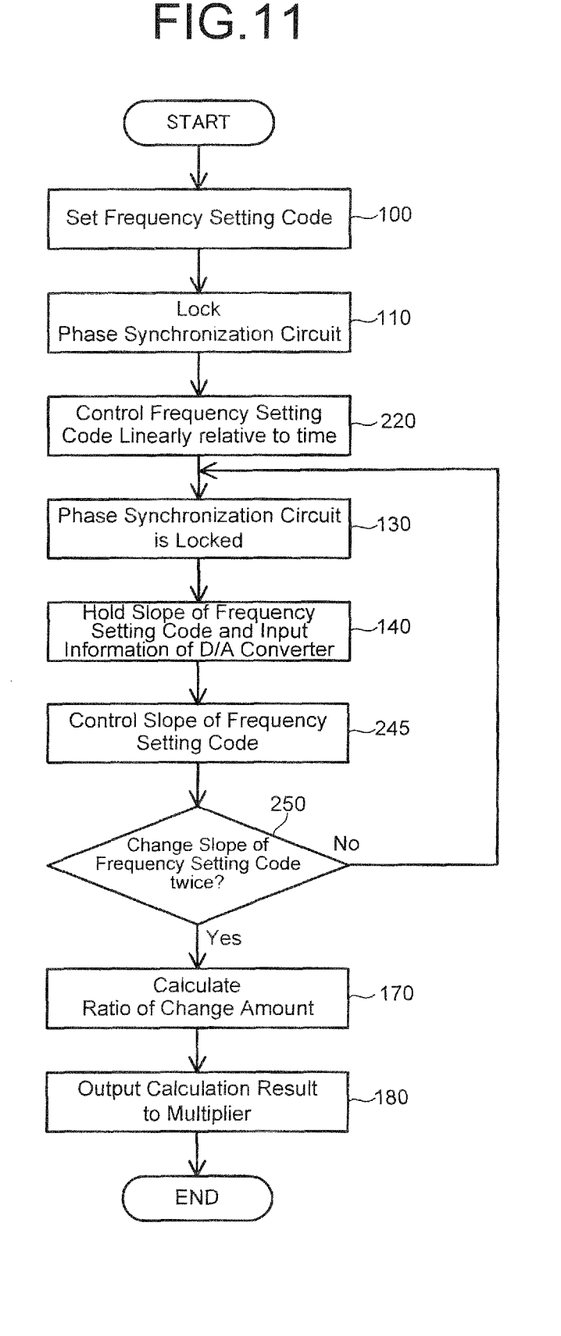
FIG. 11 is a flowchart explaining the other example of the gain calibration in the second to fourth embodiments.

Subsequently, another example of the gain calibration operation in the signal generating circuits 2 to 4 of the second to fourth embodiments is described in detail with reference to FIG. 11. FIG. 11 is a flowchart illustrating the operation example of the gain calibration. Hereinafter, the signal generating circuit 2 illustrated in FIG. 4 is described as a representative example. Note that the operation example illustrated in FIG. 11 is the one in which a part of the steps in the operation example illustrated in FIG. 10 is changed, and therefore, common reference numerals are used to designate the common operations, and the redundant descriptions are not given.

Before the gain calibration, the code generator 25 generates the frequency setting code at the fixed value and inputs to the comparator 30 (Step 100). The frequency setting code at the fixed value is input to the current output DAC50 via the LPF35, the variable gainer 40, the multiplier 45, and converted into the analog current. The integrator 55 converts the converted analog current into the control voltage, and the VCO5 oscillates based on the control voltage. At this time, the frequency setting code is the fixed value, and therefore, the VCO5 oscillates at a predetermined frequency.

The oscillation signal of the VCO5 is divided by the frequency divider 10, and input to the digital phase detector 15. The digital phase detector 15 extracts the phase information from the divided oscillation signal and outputs the digital phase information. The differentiator 20 converts the digital phase information into the digital frequency information. The comparator 30 compares the frequency setting code output by the code generator 25 and the digital frequency information, but the frequency setting code is the fixed value, and therefore, the error information converges little by little. As a result, the signal generating circuit 2 is locked at a predetermined frequency, and the frequency of the oscillation signal of the VCO5 becomes the value corresponding to the frequency setting code (S110).

After the VCO5 is locked at the predetermined frequency, the code generator 25 outputs the frequency setting code which changes linearly relative to the time and of which slope changes at a predetermined interval (S220). For example, the code generator 25 outputs the frequency setting code having values represented in a triangular wave shape relative to the time. The code generator 25 outputs a code which increases, for example, linearly relative to the time just after the output. As a result, the VCO5 outputs the signal having the frequency change corresponding to the frequency setting code, and it is locked. Namely, the VCO5 starts the oscillation of the FMCW signal (S130).

The VCO5 is locked at the oscillation state of the FMCW signal, then the gain calculator 65 holds each of the change amount information of the frequency setting code and the error information input to the current output DAC50 (S140).

The code generator 25 changes the slope of the frequency setting code at a predetermined time interval (S245). For example, when the change amount of the frequency setting code which is output initially is positive, the code generator 25 changes the change amount of the frequency setting code into negative.

Note that the gain calculator 65 always monitors the slope of the frequency setting code generated by the code generator 25, and judges whether or not the change of the slope occurs twice (S250). When the slope changes only once ("No" in S250), the VCO5 is locked after outputting the signal having the frequency change corresponding to the frequency setting code of which slope is changed (S130), and the gain calculator 65 holds each of the change amount of the frequency setting code and the input information to the current output DAC50 after the phase synchronization circuit is locked (S140). Namely, when the change of the slope is only once, the gain calculator 65 holds only the information before the change of the slope, and therefore, the change amount and the input information are held again after the VCO5 is locked.

When the change of the slope occurs twice ("Yes" in S250), the gain calculator 65 already obtains both the information before and after the change of the slope, and therefore, the gain calculator 65 calculates each of the change amount of the slope of the frequency setting code and the change amount of the information input to the current output DAC50 by using each of values of the change amount information and the error information which are held before and after the change of the slope, and calculates a ratio between the change amounts with each other (S170). A calculation result becomes "$N \cdot f_{ref}/K_{DAC} \cdot K_S \cdot K_{VCO}$", and therefore, it becomes possible to normalize the gain of the analog part by outputting the calculation result to the multiplier 45 (S180).

In the calibration operation example illustrated in FIG. 11, the code generator 25 in itself generates the FMCW signal such as the triangular wave, and the gain calculator 65 detects the change of the slope of the frequency setting code. Therefore, it is possible to obtain the change amount information of the frequency setting code and the error information input to the current output DAC50 at both before and after the change of the slope.

(Fifth Embodiment)

Next, a radar device according to a fifth embodiment is described with reference to FIG. 12. The radar device according to the embodiment uses the signal generating circuits 1 to 4 according to the first to fourth embodiments. Accordingly, common reference numerals are used to designate elements common to the first to fourth embodiments, and redundant descriptions are not given.

Figure 12:
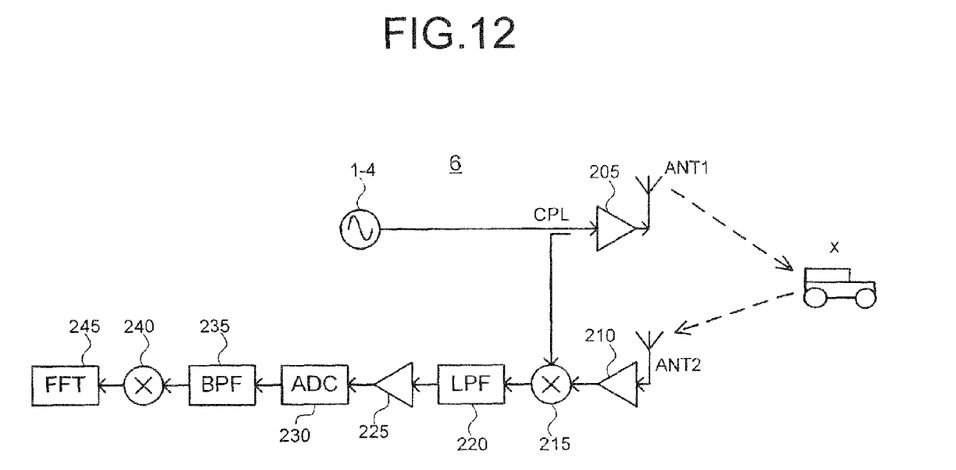
FIG. 12 is a block diagram explaining a radar device according to a fifth embodiment.

As illustrated in FIG. 12, a radar device 6 according to this embodiment includes the signal generating circuits 1 to 4 according to the first to fourth embodiments, a power amplifier 205, a transmitting antenna ANT1, a receiving antenna ANT2, a high-frequency amplifier 210, a coupler CPL, a mixer 215, a low-pass filter 220, an amplifier 225, an A/D converter 230 (ADC230), a band-pass filter 235 (BPF235), a frequency converter 240, and a Fourier transformer 245.

The power amplifier 205 is a transmission amplifier amplifying the oscillation signals of the signal generating circuits 1 to 4 up to a predetermined power. The transmitting antenna ANT1 radiates a high-frequency signal amplified by the power amplifier 205 into a space. The receiving antenna ANT2 receives a reflected signal transmitted from the transmitting antenna ANT1 and reflected by a detection (or measurement) object X of the radar device 6.

The high-frequency amplifier 210 amplifies the reflected signal received by the receiving antenna ANT2 up to a predetermined level. It is desirable that an amplifier suitable for a high-frequency such as, for example, an LNA is used for the high-frequency amplifier 210. The coupler CPL branches the output signals of the signal generating circuits 1 to 4 (a previous stage of the input of the power amplifier 105). Note that the outputs of the signal generating circuits 1 to 4 may be directly branched instead of the coupler CPL.

The mixer 215 multiplies the reflected signal amplified by the high-frequency amplifier 210 and an oscillation signal branched by the coupler CPL. When a frequency of the reflected signal is represented by "fr", and a frequency of the oscillation signal is represented by "ft", the mixer 215 outputs signals of "fr+ft" and "|fr−ft|". The low-pass filter 220 passes only a beat signal having the frequency of "|fr−ft|" from among the outputs of the mixer 215. In addition, the low-pass filter 220 functions to remove a signal having a folding frequency or higher of the A/D converter at a subsequent stage. The amplifier 225 amplifies the beat signal up to a level necessary for a subsequent analog-digital conversion.

The ADC230 performs an A/D conversion of the beat signal amplified by the amplifier 225. The BPF235 digitally removes a noise component of a flicker noise and digitally removes a high-frequency component which is not removed by the low-pass filter 120 at an analog stage. As a result, the BPF235 extracts only a signal component of the beat signal.

The frequency converter 240 converts the obtained signal component of the beat signal into a frequency suitable for a Fourier transform. The Fourier transformer 245 calculates a time difference between the transmitted oscillation signal and the received reflected signal from the signal component of the beat signal, and performs a calculation calculating a distance to the detection object.

According to this embodiment, it is possible to provide a radar device using the low-noise, high-frequency accuracy, and high linearity FMCW signal because the signal generating circuits according to the first to fourth embodiments are used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal generator, comprising:
   an oscillator to produce an oscillation signal controlled in an oscillating frequency by an analog control signal;
   a digital phase detector to detect phase information of the oscillation signal and output digital phase information;
   a first differentiator to differentiate the digital phase information and output digital frequency information;
   a comparator to compare a frequency setting code setting the oscillating frequency with the digital frequency information and output digital frequency error information;
   a low-pass filter to remove a high-frequency component of the digital frequency error information;
   a D/A converter to convert the digital frequency error information of which the high-frequency component is removed into analog frequency error information;
   an integrator to integrate the analog frequency error information, convert into analog phase error information, and output the analog phase error information as the analog control signal;
   a second differentiator to differentiate the frequency setting code;
   a gain calculator to calculate a ratio between information input to the D/A converter and a differential value information of the frequency setting code differentiated by the second differentiator; and
   a multiplier to multiply the digital frequency error information of which the high-frequency component is removed, by a calculation result of the gain calculator.

2. The signal generator according to claim 1, wherein the gain calculator calculates the ratio based on the information input to the D/A converter and the differential value information of the frequency setting code differentiated by the second differentiator both before and after a change of a change amount represented by the frequency setting code.

3. The signal generator according to claim 1, further comprising a code generator to generate the frequency setting code and input the generated frequency setting code to the comparator.

4. A radar device, comprising:
   the signal generator according to claim 1;
   a transmitter to transmit the oscillation signal of the signal generator as a transmitted signal;
   a mixer to multiply a received signal in which the transmitted signal transmitted by the transmitter returns by being reflected by a detection object and the transmitted signal to generate a beat signal; and
   a calculator to calculate the beat signal to generate a distance data to the detection object.

5. The signal generator according to claim 1, wherein the oscillation signal is controlled to have the oscillating frequency increase and decrease linearly relative to time.

6. The signal generator according to claim 1, wherein the ratio is calculated by dividing a change amount of a differentiation result of the second differentiator by a corresponding change amount of the information input to the D/A converter.

7. The signal generator according to claim 1, wherein the integrator includes a capacitor.

8. The signal generator according to claim 1, wherein the digital phase detector, the first differentiator, the comparator, the low-pass filter, and the D/A converter are configured to perform a signal processing digitally.

9. The signal generator according to claim 8, wherein the integrator is configured to perform a signal processing digitally.

10. The radar device according to claim 4, wherein the gain calculator calculates the ratio based on the information input to the D/A converter and the differential value information of the frequency setting code differentiated by the second differentiator both before and after a change of a change amount represented by the frequency setting code.

11. The radar device according to claim 4, further comprising a code generator to generate the frequency setting code and inputs the generated frequency setting code to the comparator.

12. The radar device according to claim 4, wherein the oscillation signal is controlled to have the oscillating frequency increase and decrease linearly relative to time.

13. The radar device according to claim 4, wherein the ratio is calculated by dividing a change amount of a differentiation result of the second differentiator by a corresponding change amount of the information input to the D/A converter.

14. The radar device according to claim 4, wherein the integrator includes a capacitor.

15. The radar device according to claim 4, wherein the digital phase detector, the first differentiator, the comparator, the low-pass filter, and the D/A converter are configured to perform a signal processing digitally.

16. The radar device according to claim 15, wherein the integrator is configured to perform a signal processing digitally.

\* \* \* \* \*